US011819008B2

(12) United States Patent
Adams et al.

(10) Patent No.: US 11,819,008 B2
(45) Date of Patent: Nov. 21, 2023

(54) LIVESTOCK SORTING FACILITY

(71) Applicant: ADAMS LAND & CATTLE CO., Broken Bow, NE (US)

(72) Inventors: William R. Adams, Broken Bow, NE (US); Jerry D. Adams, Broken Bow, NE (US)

(73) Assignee: Adams Land & Cattle Co., Omaha, NE (US)

( * ) Notice: Subject to any disclaimer, the term of this patent is extended or adjusted under 35 U.S.C. 154(b) by 0 days.

(21) Appl. No.: 17/719,178

(22) Filed: Apr. 12, 2022

(65) Prior Publication Data

US 2022/0386570 A1 Dec. 8, 2022

Related U.S. Application Data

(63) Continuation of application No. 16/103,959, filed on Aug. 16, 2018, now Pat. No. 11,324,203.

(60) Provisional application No. 62/546,453, filed on Aug. 16, 2017.

(51) Int. Cl.
| | | |
|---|---|---|
| *A01K 29/00* | (2006.01) | |
| *G05B 19/05* | (2006.01) | |
| *A01K 1/06* | (2006.01) | |
| *A01K 1/00* | (2006.01) | |

(52) U.S. Cl.
CPC .......... *A01K 29/005* (2013.01); *A01K 1/0023* (2013.01); *A01K 1/0613* (2013.01); *G05B 19/056* (2013.01); *G05B 2219/45047* (2013.01)

(58) Field of Classification Search
CPC .... A01K 29/00; A01K 29/005; A01K 1/0023; A01K 1/0613; A22C 29/005; A22C 1/0023; A22C 1/0613

USPC .................................................. 119/842, 174
See application file for complete search history.

(56) References Cited

U.S. PATENT DOCUMENTS

| | | | |
|---|---|---|---|
| 4,039,220 A | 8/1977 | Stoops | |
| 4,280,488 A * | 7/1981 | Polsky | ................. A61F 5/0111 602/65 |
| 4,288,856 A * | 9/1981 | Linseth | ................. G01G 17/08 119/51.02 |
| 5,644,643 A | 7/1997 | Scofield et al. | |
| 6,974,373 B2 | 12/2005 | Kriesel | |
| 7,039,220 B2 * | 5/2006 | Kriesel | ................. A01K 29/00 382/110 |

(Continued)

FOREIGN PATENT DOCUMENTS

| | | |
|---|---|---|
| WO | 2017030448 A1 | 2/2017 |
| WO | 2017031532 A1 | 3/2017 |

OTHER PUBLICATIONS

International Search Report and Written Opinion dated Nov. 27, 2018 for PCT/US18/046798.

*Primary Examiner* — Richard T Price, Jr.
(74) *Attorney, Agent, or Firm* — Suiter Swantz pc llo

(57) ABSTRACT

Systems and methods for sorting livestock including a livestock processing station, a computer network system, and a livestock routing mechanism. The livestock processing station confines the individual livestock, allowing individual livestock data to be collected and analyzed. The computer network system includes a programmable logic controller (PLC) for data input at the livestock processing station and a sorting application coupled to the PLC via a computer network, the sorting application for analyzing individual livestock data and assigning livestock to pens.

4 Claims, 16 Drawing Sheets

(56) References Cited

U.S. PATENT DOCUMENTS

| | | | |
|---|---|---|---|
| 7,214,128 B2 * | 5/2007 | Kriesel | ............... A22B 5/201 |
| | | | 452/157 |
| 7,389,743 B2 | 6/2008 | Adams et al. | |
| 8,036,429 B2 | 10/2011 | Doyle | |
| 2005/0211174 A1 | 9/2005 | Ellis | |

* cited by examiner

Verification 180

LIVESTOCK SORTING FACILITY

CROSS-REFERENCE TO RELATED APPLICATIONS

The present application claims priority under 35 U.S.C. § 119(e) to U.S. Provisional Patent Application Ser. No. 62/546,453, filed Aug. 16, 2017, titled LIVESTOCK SORTING FACILITY, naming William R. Adams and Jerry D. Adams as inventors, which is incorporated herein by reference in the entirety.

FIELD OF THE INVENTION

The present disclosure generally relates to the field of management of livestock in a feedlot, and more particularly to a system and method of processing and sorting livestock at a feedlot for optimum beef quality and maximum economic return to the feedlot and producer.

SUMMARY OF THE INVENTION

Embodiments of a sorting facility for sorting livestock are disclosed. In one aspect, the sorting facility may include a weigh box having holding bars for holding livestock in a processing station. In another aspect, the sorting facility may include one or more sensors to collect weight and bone structure measurements while the animal is in the processing station. In another aspect, a sensor of the one or more sensors may include a light curtain for measuring the bone structure. In another aspect, the sorting facility may include a programmable logic controller (PLC) with access to memory having computer executable program code embodied therein. In another aspect, the PLC is configured to: receive measurements collected by the one or more sensors; provide the measurements collected to a sorting application; and output a feed-pen destination based on a sorting computation performed by the sorting application.

Other embodiments of a sorting facility for sorting livestock are disclosed. In one aspect, the sorting facility may include a weigh box having holding bars for holding livestock in a processing station. In another aspect, the sorting facility may include one or more sensors to collect weight and bone structure measurements while the animal is in the processing station. In another aspect, a sensor of the one or more sensors includes a light curtain for measuring the bone structure. In another aspect, the sorting facility may include a programmable logic controller (PLC) having access to memory with computer executable program code. In another aspect, a processor and/or the PLC executes the computer program code to perform the following steps: (1) receive measurements collected by the one or more sensors; and (2) provide the measurements collected to a sorting application. In another aspect, the sorting facility may include a sorting application in communication with the PLC, the sorting application having access to memory with computer executable program code. In another aspect, a processor and/or the sorting application executes the computer program code to perform the following steps: (1) calculate a feed-pen destination based on the measurements received from the PLC; and (2) output the feed-pen destination to at least one of: an input/output device or a livestock routing mechanism.

Embodiments of a method for sorting livestock are disclosed. In one aspect the method may include capturing an animal in a weigh box of a processing station. In another aspect, the method may include collecting bone structure and weight measurement data from one or more sensors associated with the weigh box. In another aspect, the method may include verifying a validity of the measurements obtained by the one or more sensors. In another aspect, the method may include sorting the animal according to a fed-pen determination based on the measurements obtained by the one or more sensors. In another aspect, the method may include providing the feed-pen determination to a livestock routing mechanism to deliver the animal to a gate of a feed pen assigned according to the feed-pen determination. In another aspect, the livestock routing mechanism may include a trolley or an electronically controllable gate having a programmable memory associated therewith in order to store the feed-pen determination at least until the animal is delivered to its assigned feed pen.

It is to be understood that both the foregoing general description and the following detailed description are exemplary and explanatory only. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present disclosure may be better understood by those skilled in the art by reference to the accompanying figures in which.

DETAILED DESCRIPTION OF THE INVENTION

Figure 1:
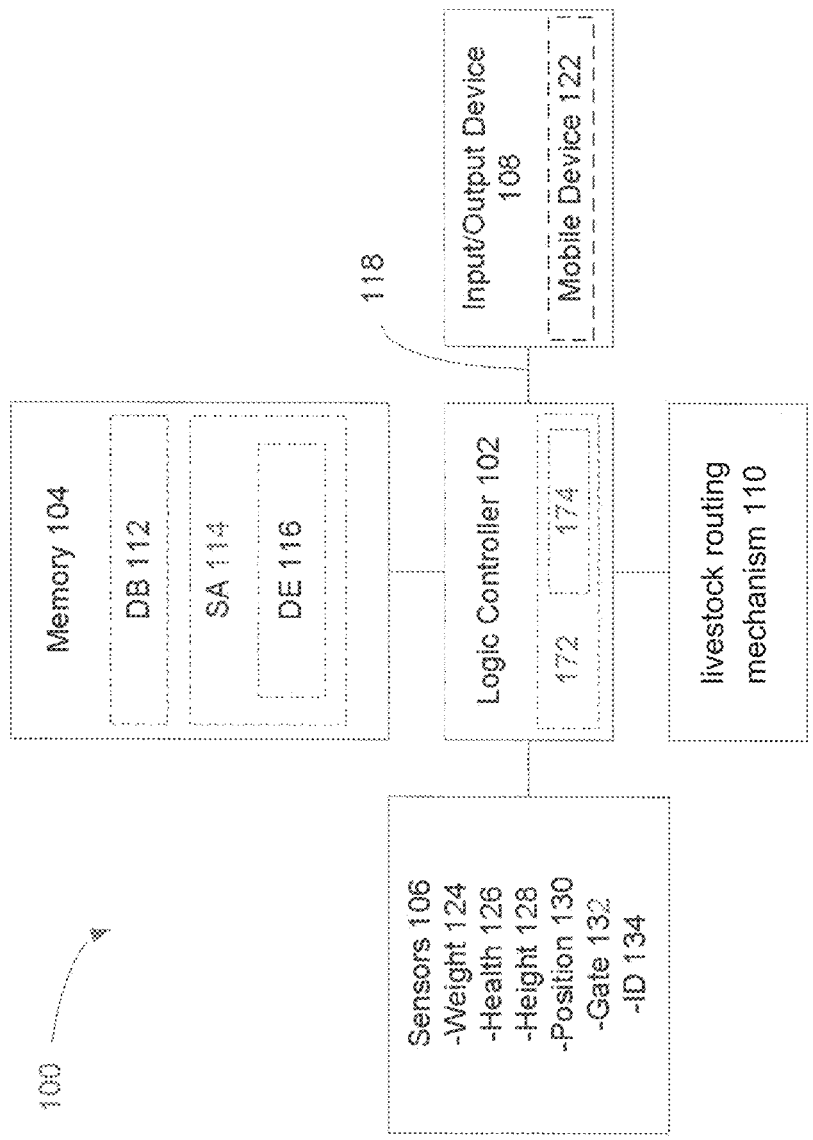
FIG. 1, is a block diagram of a sorting system, in accordance with an embodiment of the present disclosure, in accordance with an embodiment of the present disclosure.

Reference will now be made in detail to the presently preferred embodiments of the invention, examples of which are illustrated in the accompanying drawings.

It is noted that information related to a processing station, a holding area, a livestock routing mechanism, and combinations thereof, is disclosed in U.S. Pat. No. 7,389,743B2, by Adams, et al., filed May 23, 2005, issued Jun. 24, 2008, and titled LIVESTOCK SORTING FACILITY, which is incorporated herein by reference in its entirety.

Module," "block", "sub-block", or "sub-module" as used herein means a combination of hardware and software configured to perform one or more steps, processes and/or algorithms of the inventive concepts disclosed herein.

"Memory" as used herein, and unless otherwise specified, means any temporary or permanent storage medium known in the art suitable for storing program instructions (e.g., computer executable program code) executable by an associated one or more processors. Memory may also be stored in an organized format, encompassing, for example, a database. Memory may include one or more storage mediums. For example, memory may include, but is not limited to, a read-only memory, a random access memory, a magnetic or optical memory device (e.g., disk), a magnetic tape, a solid state drive, or combinations thereof. In embodiments, memory includes a buffer (e.g., frame buffer) and/or a cache. The memory includes non-transitory memory. In embodiments, the memory may be located remotely with respect to a platform for which it is used.

"Processor" as used herein means any processing device, including but not limited to, a microprocessor, an application specific integrated circuit (ASIC), a field programmable gate array (FPGA), a central processing unit (CPU), an arithmetic logic unit (ALU), a digital signal processor (DSP), or combinations thereof Large feedlots which are utilized by cattle producers (e.g. ranchers) to improve cattle condition prior to use or distribution are faced with the problem of caring for a cattle population that may be extremely diverse. Both genetic as well as environmental factors contribute to the tremendously diverse cattle population within a given feedlot. Such diversity has greatly increased the complexity of large feedlots, because if a feedlot and producer desires to produce quality meat at the lowest possible cost for the maximum economic return, the individual needs of each animal must be assessed (e.g., the measuring and tracking of physical as well as other performance characteristics of each cow during their period at the feedlot). If such individuality is not addressed, the cost to produce quality meat may increase significantly while possibly reducing the maximum economic return to the feedlot and producer.

For example, a rancher who does not first measure bone structure or other size measurements, and who proceeds to feed livestock more feed than the livestock requires to obtain an optimal score, or transversely, a rancher who feeds livestock less feed than required to obtain the optimal score, may not be maximizing economic return. For this reason, methods are provided to feed lot operators to first obtain livestock size parameters, physical characteristics, health characteristics, and combinations of size parameters, physical characteristics, and/or health characteristics in order to determine feed requirements for obtaining a pre-determined optimal score. However, not all parameters/characteristics or combinations of parameters/characteristics produce an accurate pre-determined optimal score for the animal. For example, based on weight and girth alone, an initial pre-determined frame score of an animal may be significantly different than the final frame score used to put the animal on the market. Therefore, methods disclosed herein use combinations, such as weight, health characteristics, and bone structure (e.g., hip height) to obtain a pre-determined score (e.g., frame score and/or health score) that will accurately reflect a final, market-based score.

Generally, as disclosed herein, animals are measured using automated measuring systems, which are converted into digital inputs of a sorting algorithm of a sorting system. The sorting algorithm determines a pre-determined optimal frame score, a daily feed administration recommendation, a treatment regimen, and an assigned pen where each of the feed/treatment determinations will best be achieved. The assigned pen has a gate associated with a livestock routing mechanism. The sorting algorithm produces an output that results a livestock routing mechanism directing the animal to the gate of the assigned pen via the actuation of livestock routing mechanism components (e.g. trolleys, electronically controlled gates, etc.). Upon arrival, a gate is opened (manually or automatically) and the animal exits to its assigned pen until a future measurement and sorting cycle produces a new pen assignment.

Referring now to FIG. 1, a sorting system 100 in accordance with the present disclosure is provided in which the system 100 includes a logic controller (PLC) 102, a memory 104, one or more sensors 106, an Input/Output (I/O) device 108, and at least one livestock routing mechanism 110 (e.g. a trolley configured to transport livestock, one or more electronically controlled gates configured to open or close to provide passage to livestock, etc.). In an exemplary embodiment, the logic controller 102 includes a programmable logic controller (PLC). The PLC may include a logical interface to facilitate accesses to, and/or from, programmable memory via one or more processors to perform a sorting operation in accordance with the present disclosure. The memory 104 includes a database 112, or multiple databases, which individually or collectively are accessed by computer executable program code. In an exemplary embodiment, the computer executable program code may include multiple modules, including, but not limited to, a Sorting Application (SA) 114 and a Decision Engine (DE) 116. In another exemplary embodiment, the DE 116 is a sub-module of the SA 114.

In an exemplary embodiment, the components of system 100 are communicatively coupled via a communication link 118. For example, the communication link 118 may comprise a wired and/or wireless communication link. For instance, the system 100 may be configured to communicate with a livestock routing mechanism 110 and/or a mobile device 122 (below) using link 118, where link 118 may include a Bluetooth, infrared, other similar wireless link, a network communication link (e.g., wide area network (WAN), local area network (LAN), controlled area network (CAN), Ethernet, or combinations thereof), or combinations thereof.

In an exemplary embodiment, the sensors 106 include, but are not limited to, a weight sensor 124, a health sensor 126, a height sensor 128, a position sensor 130, a gate sensor 132, and an identification (ID) sensor 134. It is noted that this list of sensors is not intended to be limiting, as other sensors may be contemplated in the inventive concepts of the present disclosure. For example, the sensors 106 may include a thermometer, an ear canal sensor, an X-ray emitter and receiver, wearable motion sensors, other health determining sensors, or combinations thereof. For instance, the sensors 106 may include an infrared laser thermometer for identifying the exterior temperature of an animal in weigh box or a Bluetooth, or other wirelessly connected thermometer that is inserted into the mouth, ear, or rectum of the animal.

The weight sensor 124 may include, but is not limited to, a load cell capable of producing a signal, a portion of which (e.g., magnitude) is proportional to an amount of force received thereon. For example, the load cell may include at least one of: a hydraulic load cell, a pneumatic load cell, a strain-gauge load cell, or combinations thereof.

Figure 2:
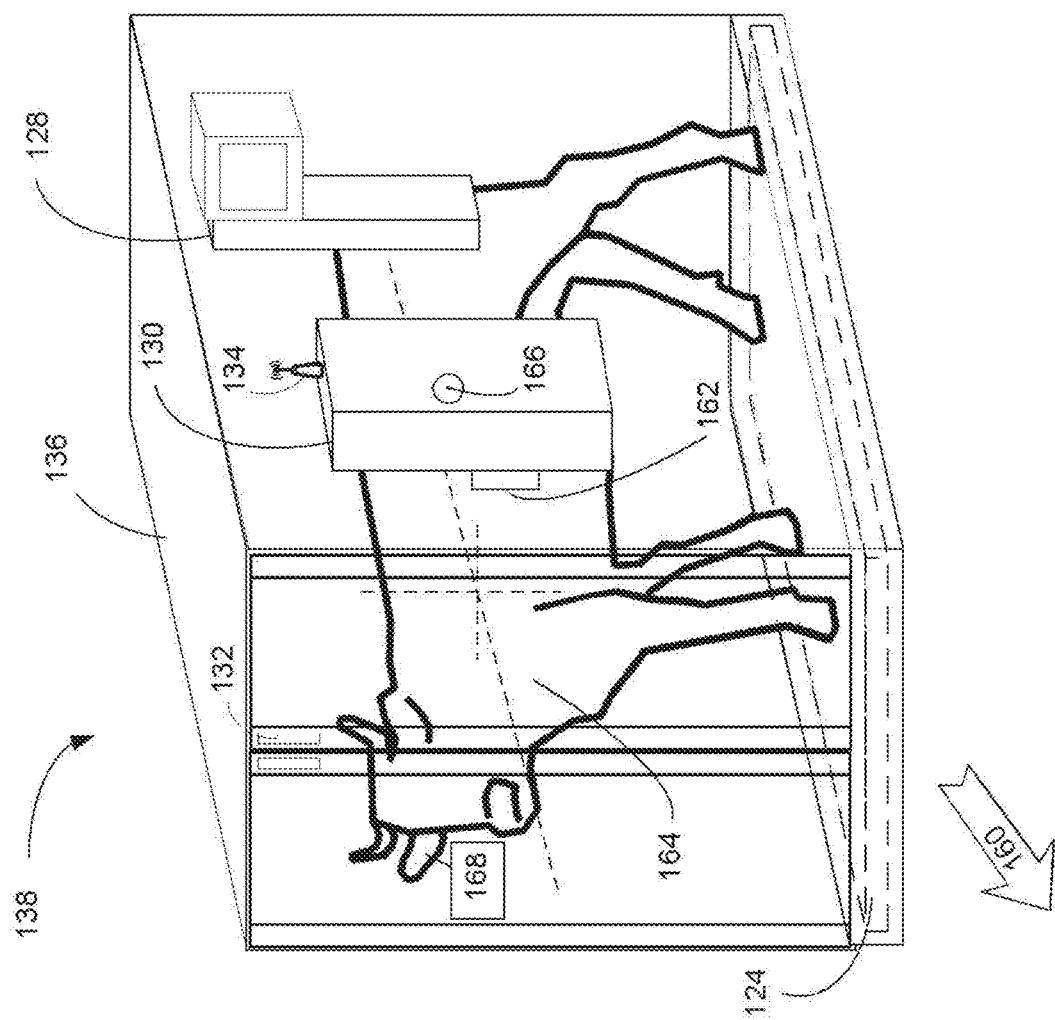
FIG. 2 is a perspective view of a processing station, in accordance with an embodiment of the present disclosure.

Referring now to FIG. 2, in an exemplary embodiment, the one or more sensors 106 and the I/O device 108 are associated with (e.g., attached to or in close proximity with) a weigh box 136 of a processing station 138. For example, the weight sensor 124 may be positioned below or incorporated within the weigh box 136.

In an exemplary embodiment, the processing station 138 includes, but is not limited to, the weigh box 136, the sensors 106, the PLC 102, and the I/O device(s) 108.

In an exemplary embodiment, the weigh box 136 has multiple (e.g., four) sides and multiple (e.g., two) gates with sensors 106 attached or in close proximity to the weigh box 136. A proxy may be associated (e.g., above or on) each gate to show when the animal is captured.

In an exemplary embodiment, the processing station 138 is incorporated with the livestock routing mechanism 110 such that upon collecting data with respect to an animal, the animal is loaded from the weigh box 136 of the processing station 138 and directed via the livestock routing mechanism 110 may be actuated to move the animal to its assigned pen. In another exemplary embodiment, the animal is directed to a holding area located between the processing station 138 and the livestock routing mechanism 110.

In an exemplary embodiment, a height of the animal may be obtained by height sensor 128, which may be based on the bone structure of the animal. For example, the height of the animal may be based on a hip bone or a hip bone height of the animal.

Figure 3:
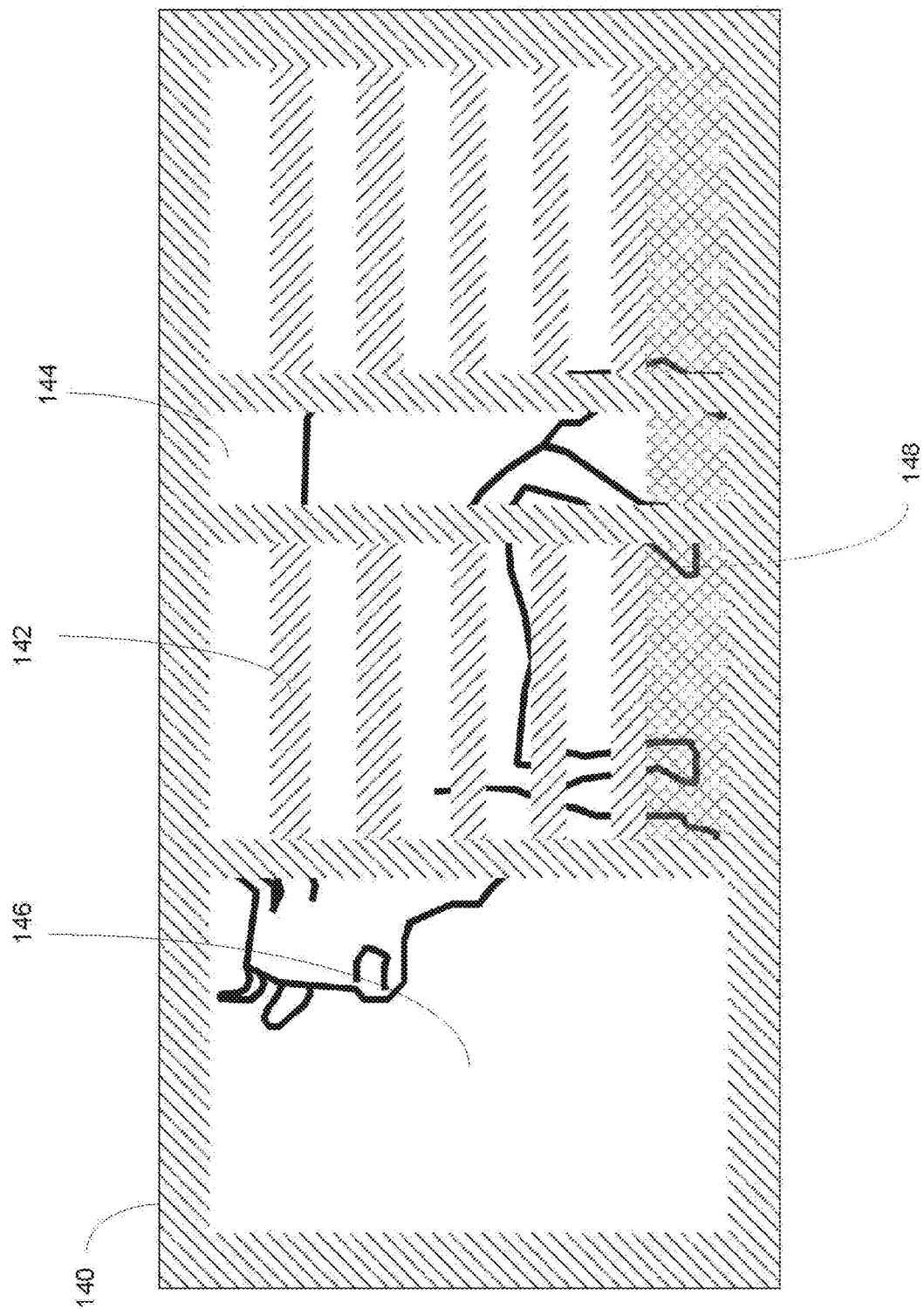
FIG. 3 is a side sectional view of a processing station, in accordance with an embodiment of the present disclosure.

Referring now to FIG. 3, in an exemplary embodiment, the weigh box 136 is configured to maximize data measurements from sensors 106, maximize sensor transmission and reception, and simultaneously minimize sensor obstructions due to moving (e.g., kicked up) dirt and debris. For example, the weigh box 136 may include a side 140 having gaps in holding bars 142 corresponding to specific sensors, and guards to minimize dirt and debris contact and obstruction of sensors 106. For instance, the weigh box 136 may include a light curtain gap 144, a position sensor and ID sensor gap 146, and a dirt guard 148. It is noted that while FIG. 3 depicts the dirt guard 148 as a semi-transparent mesh between holding bars 142 and covering a bottom portion of one or more weigh box gaps, this depiction is not limiting. For instance, the dirt guard 148 may be a semi-transparent mesh positioned over an entire portion of the light curtain gap 144. By way of another example, the dirt guard 148 may be a transparent substrate (e.g., glass, plastic, etc.).

In some embodiments, the weigh box 136 is covered, closed, or otherwise configured to hinder ambient light from interfering with readings from the one or more sensors 106 (e.g., height sensor 126). In this regard, a closed or covered weigh box 136 may have openings of sufficient size and shape to accommodate the sensors 106 and enable them to receive input from within the weigh box 136. For example, the openings may include, but are not limited to, the light curtain gap 144 and ID sensor gap 146.

In some embodiments, portions of the weigh box 136 are adjustable. For example, one or more of the holding bars 142, the light curtain gap 144, and the ID sensor gap may be adjustable according to one or more dimensions (e.g., width, height, length, rivets, etc.). For instance, mounting holes may be positioned at intervals along a side of the weigh box for mounting the holding bars 142 in a first mounting hole or in a second mounting hole depending on a desired separation distance between the holding bars 142. In this regard, fasteners (e.g., nuts, bolts, screws, etc.) are detachable and/or removable to accommodate the dimension adjustments made to the weigh box 136.

Figure 4:
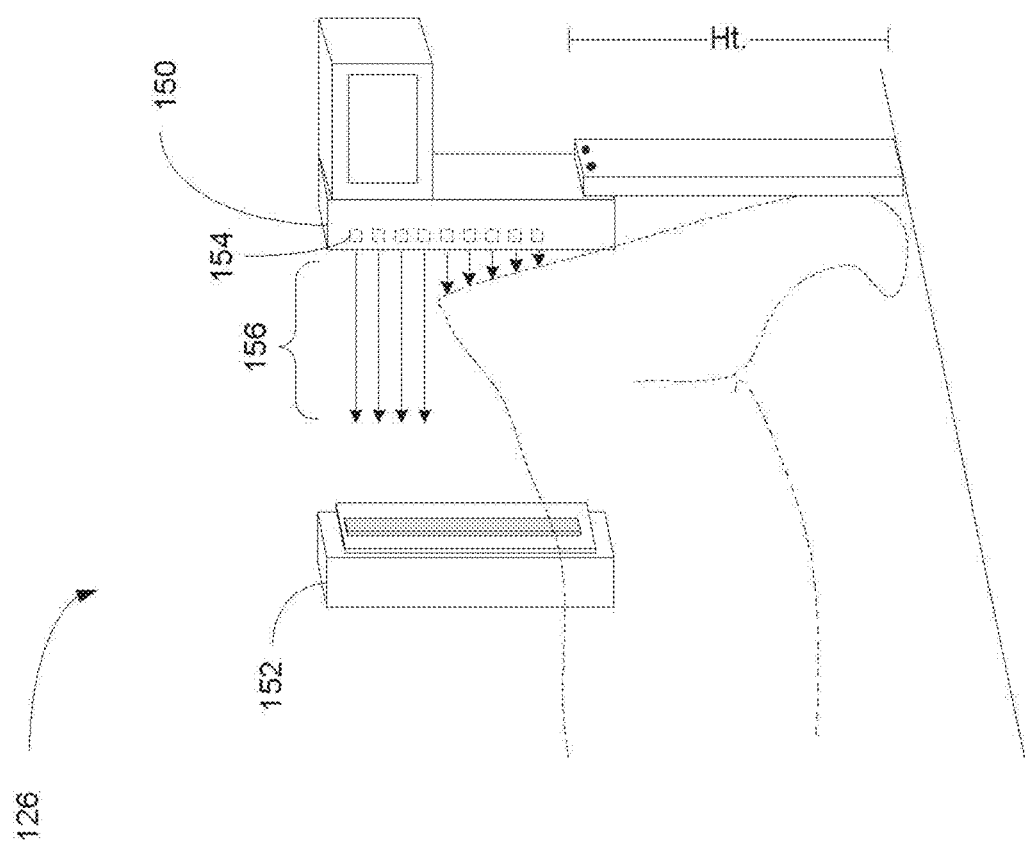
FIG. 4 is a partial or deconstructed perspective view of a processing station and height sensor, in accordance with embodiments of the present disclosure.

Referring now to FIG. 4A, in an exemplary embodiment the sensors 106 may include a height sensor 126. The height sensor 126 may include a light curtain 150. For example, the light curtain 150 may include a light emitter (e.g., halogen lamp, fluorescent light, light emitting diode (LED), white LED, X-ray photon emitter, etc.) that is configured to emit wavelengths of light and a light receiver (e.g., light detector, camera, structured light scanner, phototransistor (PT), photodiode, etc.) 152 is configured to receive the wavelengths of light emitted. In other words, a light source 154 may be in optical alignment with an individual light receiver 152. In this regard, the light curtain 150 and/or the receiver may include additional optical elements, connecting elements, and/or circuitry elements, including but not limited to, a lens (e.g., focusing lens, wide angle lens, etc.), an amplifier, a rolling shutter, an imaging receiver, an imaging processor, one or more resistors, one or more shift registers, or combinations thereof.

It is noted that the light curtain 150, the receiver 152, or both, may be configured for movement before, during, or after a height measurement. It is further noted, that the size of the weigh box 136, or the size of any gaps therein, may be adjustable according to the size, angle of emission, angle of detection, movement, or combinations thereof, of the height sensor 126.

In an exemplary embodiment, the height sensor 126 is configured for optimal accuracy. For example, the light curtain 150 of the height sensor 126 may be accurate to within a 4-6 mm tolerance.

It is noted that the inventive concepts applied to the height sensor 126 (e.g., movement, placement, adjustability, etc.) may be applied to one or more additional sensors of the sensors 106. For example, referring now to FIG. 4B, the sensors 106 may include a health sensor 128. In an exemplary embodiment, the health sensor 128 may include a light curtain 150A, where the light curtain 150A is similar to the light curtain 150 for the height sensor 126, except that it may use different light sources, may be positioned or angled differently, may be configured to receive/detect different types/wavelengths of light, it may be of different dimensions (e.g., width, height, etc.), or combinations thereof.

Referring again to FIG. 4B, the light curtain 150A may include an X-ray emitter that is configured to emit X-ray photons. The health sensor 128 may further include an X-ray detector 152A. The X-ray detector 152A may include, but is not limited to, a photographic plate, photographic film, a digital detector, an image plate, a flat panel detector, a dosimeter, or combinations thereof.

In an exemplary embodiment, the health sensor 128 may be configured to detect health issues that may affect characteristics (e.g., size, weight, health, etc.) of the animal, or a frame score of the animal, in the weigh box 136. For example, the light curtain 150A may emit X-ray photons to determine whether the animal has any internal, non-readily-visible, health issues. For example, common health diseases of cattle include bovine respiratory disease complex (BRDC), bovine respiratory syncytial virus (BRSV), *Haemophilus somnus*, infectious bovine rhinotracheitis (IBR), Parainfluenza Type 3 (PI3), and other similar disease states/conditions. Because these health issues affect characteristics of the animal, in some embodiments an image of hard tissue (e.g., bones) or soft tissue (e.g., lungs) of the animal may be obtained in order to determine whether any detectable health issues (e.g., respiratory) are present. Such a detection may lead to proper treatment and increase in beneficial animal characteristics (e.g., health, size, etc.). In this regard, the X-ray detector 152A may be configured to generate, render, and/or display (e.g., by communication to controller 102 and I/O device 108) one or more radiographs (e.g., projectional, posteroanterior (PA), anteroposterior (AP), or combinations thereof).

In some embodiments, the light curtain 150 has the I/O device 108 attached thereto. For example, the light curtain 150 may have a monitor with a touch-screen and/or display attached to a side of the light curtain 150 to enable a user to interface with, and obtain measurements and/or readings from, each of the sensors 106. The readings may be obtained by one type, or multiple types, of light receiver 152.

Figure 5B:
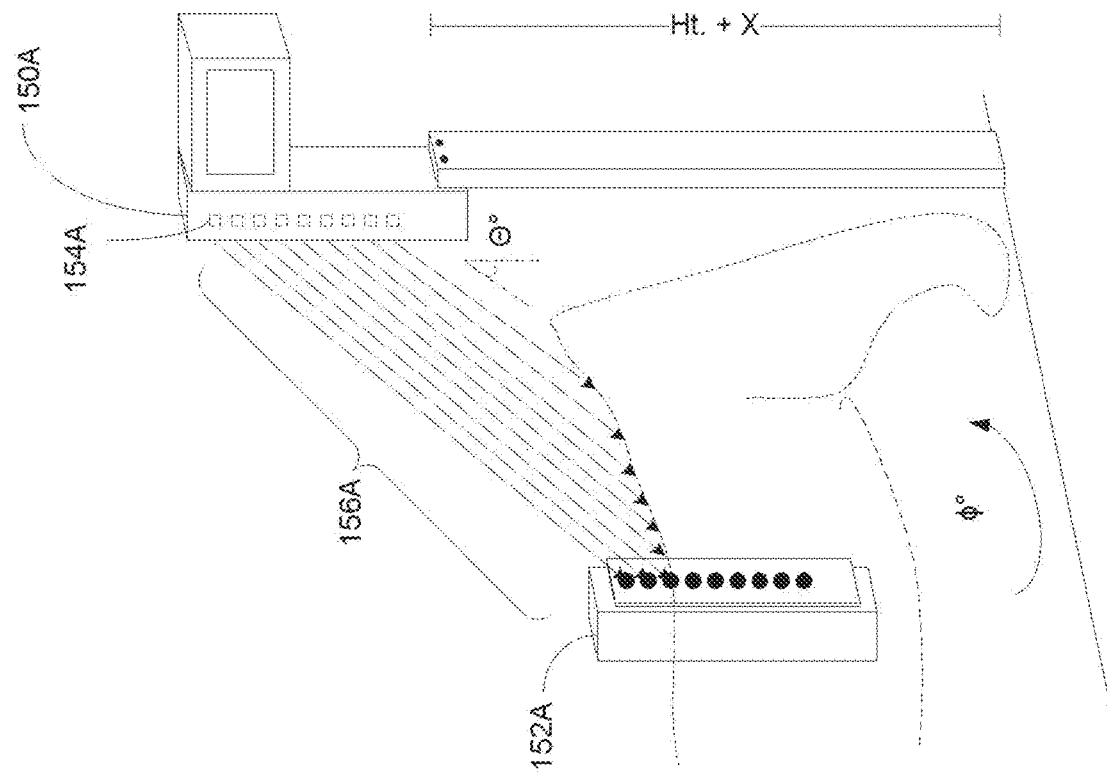
FIGS. 5A-5B are partial or deconstructed perspective views of a processing station and health sensor, in accordance with embodiments of the present disclosure.
Figure 5A:
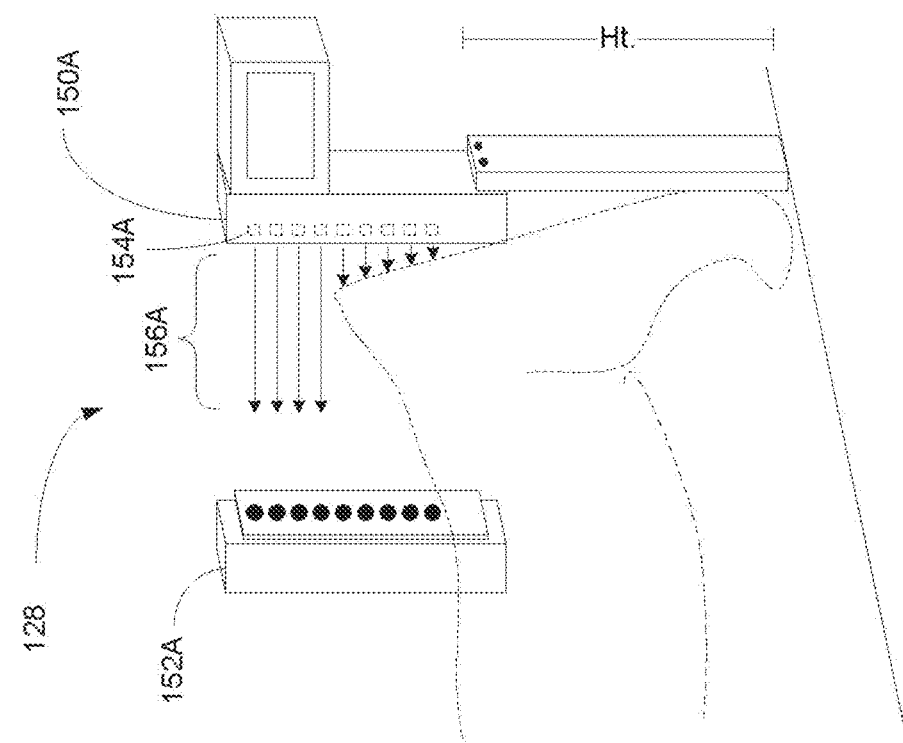
Figure 6:
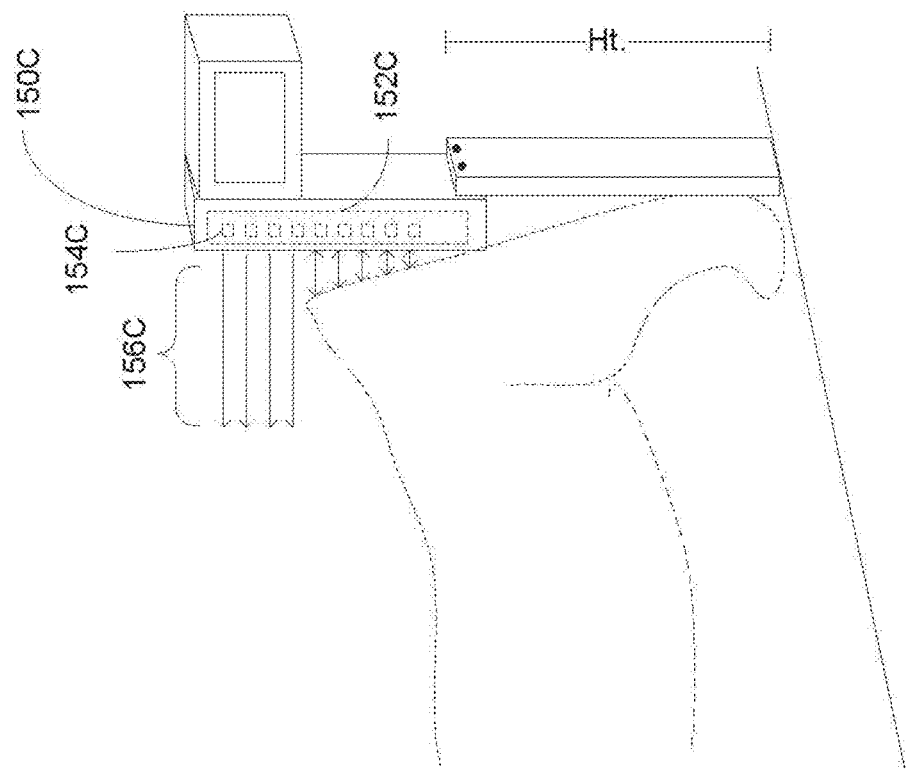
FIG. 6 is partial or deconstructed perspective views of a processing station with a reflective receiver, in accordance with embodiments of the present disclosure.

In some embodiments, the multiple types of the light receiver 152 includes a thru-beam receiver and a reflective receiver. For example, a thru-beam receiver, such as receiver 152A (e.g., FIGS. 5A-5B), may be configured to store in memory 104 a break, a disruption, or a change in energy that is detected in one or more light beam paths. By way of another example, a reflective receiver, such as receiver 152C (e.g., FIG. 6), may be able to record or detect a point or position of contrasted light.

In some embodiments, the receiver 152 is in a separate housing (e.g., thru-beam receiver 152A) than the light source 154. In other embodiments, the receiver 152 is in the same housing (e.g., reflective receiver 152C) as the light source 154.

In some embodiments, the light curtain 150 may include an array of light sources 154. For example, the array of light sources 154 may include an array of infrared lights positioned to emit parallel light beams 156 to a light curtain receiver 152. The reception of the parallel light beams 156 by the receiver 152 may be broken (e.g., FIG. 5A) or reflected (e.g., FIG. 6), respectively, by an animal entering a path of the parallel light beams 156. It is noted that while the array of light sources 154 is depicted as a vertical array, some embodiments may utilize arrays having different orientations. For example, the array of light sources may be oriented diagonally or horizontally. For instance, the array of light sources 154 may include one or more line lights, including one or more halogen lights and/or one or more fluorescent lights arranged diagonally or horizontally.

In some embodiments, the array of light sources 154 may include separate and individually modulated light sources. For example, a first white LED may be modulated at a first frequency while a second white LED (e.g., blue LED pumping a yellow phosphor, red-green-blue (RGB), or red-green-blue-amber (RGBA) LEDs) may be modulated at a second frequency. Individual receivers 152 corresponding to the respectively modulated LEDs may be configured to receive the exact frequency corresponding to a specific light source 154. For instance, on-off keying (OOK) or pulse position modulation (PPM) could be used. This type of configuration may enable height determinations at greater distances of separation between the receivers 152 and the array of light sources 154. It is noted that an output power of approximately 2-10 mW may correspond to a single-element LED. It is further noted that a communication standard (e.g., visible light communication (VLC) standard) may include an IEEE 802.11 IP PHY, IEEE 802.15.7, or a JEITA CP-1221 standard and an angle of arrival (AOA) or a time difference of arrival (TDOA) technique for positioning determination.

In some embodiments, the light curtain 150 includes one or more projectors configured to perform structured light analysis. For example, the light curtain 150 may include a laser light projector configured to emit patterned light such that three-dimensional (3D) structure may be determined based on detected irregularities in the patterns.

In an exemplary embodiment, the receiver 152 may include one or more receivers. For example, the receiver 152 may include an array of receivers corresponding to the array of light sources 154.

In an exemplary embodiment, the receiver 152 is stationary and positioned to receive light from the array of light sources 154. In other embodiments, one or more actuators (e.g., servo motors) are included with the receiver 152 to rotate the receiver 152 azimuthally or elevationally, depending on the orientation of the light source 154 and a type of light being collected (e.g., incident light, reflected light, specular reflection light, or combinations thereof).

In an exemplary embodiment, the receiver 152 may be configured to detect or receive photons of light at one or more wavelengths along the electromagnetic spectrum. For example, the receiver 152 may be configured to receive wavelengths of light corresponding to a range from 1 mm to 750 nm. By way of another example, the receiver 152 may be configured to receive or detect wavelengths of light corresponding to a range from 0.1 to 10 nm. By way of yet another example, the receiver 152 may be configured to receive or detect wavelengths of light corresponding to a range from 10 to 100 nm. By way of yet another example, the receiver 152 may be configured to receive or detect wavelengths of light corresponding to a range from 360 to 950 nm.

In an exemplary embodiment, the receiver 152 may be configured to record over a specified period of time, or for a specified number of readings. For example, the receiver 152A may record a highest beam of the parallel light beams 156A that was broken over a two- to ten-second interval. In this regard, the receiver 152A may be able to obtain readings at a rate of 10 readings/second. In embodiments, the receiver 152 may be adjustable to stop after a specified number of readings. For example, the receiver 152C (FIG. 5A) may be configured to stop obtaining readings after 100 readings have been obtained.

In another embodiment, instead of broken light paths, the receiver 152C may be configured to record a position corresponding to a reading of contrasted light (e.g., light reflected vs. light not reflected).

Figure 7:
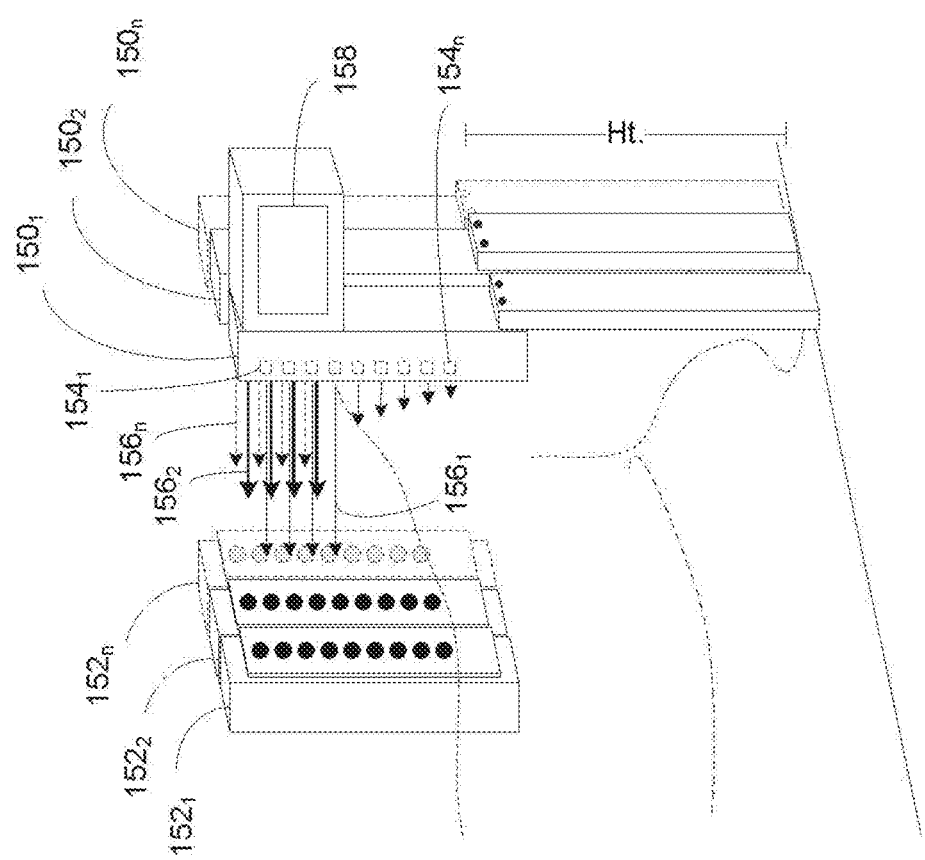
FIG. 7 is partial or deconstructed perspective view of a processing station with multiple light sources and multiple receivers, in accordance with embodiments of the present disclosure.

Referring now to FIG. 7, in an exemplary embodiment, the light curtain 150 includes multiple (e.g., two or more) light curtains, with multiple receivers 152 configured to receive emitted and/or reflected light respectively from each of the multiple light curtains 150. For example, light curtain 150 may include light curtains $150_{-1}, 150_{-2}, \ldots 150_{-n}$ with receivers $152_{-1}, 152_{-2}, \ldots 152_{-n}$ configured to receive light from a corresponding light curtain $150_{-1}, 150_{-2}, \ldots 150_{-n}$. In embodiments having multiple light curtains 150, a single I/O device 108 may be configured to interface between each of the multiple light curtains 150 such that measurements from each light curtain may be output on the single I/O device 108.

In other embodiments, the system 100 includes multiple I/O devices 108 configured to interface with the sensors 106, including the light curtain(s) 150. For example, the system 100 may include monitor 158 attached to the light curtain(s) 150 and may also include the mobile device 122 (e.g., tablet or smart phone) configured to wirelessly interface (e.g., via Ethernet, local area connection (LAN), etc.) with the sensors 106 such that an operator's presence is not necessary for viewing measurements made with sensors 106 of the system 100.

Referring now to FIGS. 4-7, in an exemplary embodiment, the array of light sources 154 includes one or more line light sources positioned to emit light beams 156 substantially at an angle. For example, referring to FIG. 5B, light may be emitted at an angle, phi ($\phi$), with respect to a longitudinal axis of the animal in the processing station 138. For instance, the angle, phi ($\phi$), may be a 70-90° elevational angle measured with respect to the longitudinal axis, resulting emitted light that is substantially orthogonal to the animal and its direction of movement 160 (see FIG. 2).

Referring again to FIG. 5B, in an exemplary embodiment, one or more of the one or more line light sources 154 may be positioned to emit light at an angle, theta ($\theta$), with respect to a vertical axis of the animal in the processing station 138. For example, the angle, $\theta$, may be an azimuthal angle from 5-45° measured with respect to the vertical axis of the animal, resulting emitted light that is angled with respect to a plane running through a center of the animal that is generally parallel with a leg whereon a measured hip is located.

In some embodiments, a light source 154 that is angled may result in the receiver 152 being positioned in a separate plane (e.g., lower, higher, offset, etc.) than the light source 154, which may extend the life of the receiver 152 and/or the light curtain 150 or result in a better measurement angle. For instance, if the light curtain 150 is positioned higher (e.g., in a separate plane such that Ht.=Ht.+distance X) than the receiver 152, then dirt and debris kicked from the animal might not readily hit or obstruct the light curtain 150.

In some embodiments, the receiver 152 may include a line-scan camera configured to collect light at an angle orthogonal to or at a diagonal to a longitudinal axis of the light emitted from the light source 154. In other embodiments, the receiver 152 may include a side collector (e.g., segmented side collector) configured to collect light scattered at different azimuthal and/or polar angles with respect to an angle of incidence.

In an exemplary embodiment, the position sensor 130 may include a photo eye 162 (FIG. 2). The photo eye 162 may be a thru-beam photoelectric sensor, a reflective sensor, or a diffuse sensor. The photo eye 162 may be positioned based on an average size of an animal. For example, the processing station 138 may be a livestock processing station for processing animals such as cows, horses, pigs, etc. In this regard, individual animals may fall within a typical size range. For instance, 80% of cattle may be within a height range of 116 to 150 cm (i.e., 46 to 58 inches), with a median hip height of 136.9 cm (e.g., 53.1 inches), which would result in a chest portion 164 (FIG. 2) of the cow positioned at a specific location or a specific range of locations as measured with respect to the processing station 138. Thus, the photo eye 162 would be positioned in the processing station 138 to activate an indicator 166 that indicates when the chest 164 of the animal is in a good position to take bone structure (e.g., hip height) measurements.

In another exemplary embodiment, the photo eye 162 is replaced by a camera compatible with image processing and/or image recognition software. The camera may be configured to communicate with indicator 166, and relay information to a processor (e.g., PLC 102) to determine, based on an image of the animal in the processing station 138, whether the animal is in proper position for measuring animal size. For example, if the image processing and/or image recognition software indicates that a head is in the field of view, as opposed to a chest, the camera may indicate that size/hip measurements should not be recorded. In another exemplary embodiment, the camera may be used together with the photo eye 162. In an exemplary embodiment, the camera may have a wide viewing angle to collect an image of an entire side of the animal. This image may be analyzed to determine a body condition score (BCS). This analysis, or similar multi-variable analysis (e.g., X-ray analysis), may be performed by an operator, and in some embodiments, by image recognition software stored within the PLC 102.

In an exemplary embodiment, the gate sensor 132 may include a gate sensor located at a gate (e.g., at a front gate or a back gate) of a processing station 138. In another exemplary embodiment, the gate sensor 132 is located at each gate of the processing station 138. A gate may include two rotating doors and the gate sensor 132, or a portion of the gate sensor 132, may be positioned on each rotating door of the gate. In an exemplary embodiment, the gate sensor 132 may include a contact sensor, a non-contact sensor (e.g., active or passive), a magnetic sensor (e.g., non-contact or contact), a dynamic sensor (e.g., constant communication with a signal from one component of the sensor), or combinations thereof.

In an exemplary embodiment, the ID sensor 134 includes a wireless ID sensor. For example, the wireless ID sensor 134 may include a low frequency (e.g., 125 kHz-135 kHz) RFID sensor. For instance, the ID sensor 134 may include one of an RFID receiver, RFID transceiver, and an RFID reader.

In an exemplary embodiment, the animal has attached thereto (e.g., ear tag) an RFID tag 168. The RFID tag 168 may include an active RFID tag or a passive RFID tag. For example, the RFID tag may include an independent power source (e.g., battery) and may be configured to independently emit a signal including one or more identifying characteristics to the ID sensor 134. Alternatively, the RFID tag 168 may receive any power requirements from radio waves emitted from the ID sensor 134.

In an exemplary embodiment, the ID sensor 134 and the RFID tag 168 enable automatic identification and data capture (AIDC). The AIDC may enable allocating and/or updating the memory 104 (e.g., database 112). For example, an animal may step into the processing station 138. Due to the proximity of the RFID tag 168 to the ID sensor 134, a processor (e.g., PLC 102) may associate the animal with a specific portion (e.g., database 112, block, sector, etc.) of the memory 104. The specific portion of the memory 104 may include one or more stored characteristics (e.g., date of birth (DOB), age, season, feed stage, weight, size, medical records and/or protocols, feed requirements, or combinations thereof). While the animal is in the processing station 138, one or more of the associated characteristics may be updated. In another exemplary embodiment, the RFID tag 168 may be newly associated with the animal, and by proximity to ID sensor 134, a specific portion of memory may be newly allocated to store characteristics associated with the animal.

In an exemplary embodiment, the PLC 102 includes programmable logic that may access memory 104, including firmware or database(s) 112, to sort an animal according to an obtained measurement. For example, the PLC 102 implements one or more sorting algorithms as disclosed herein.

The embodiments of system 100 illustrated in FIGS. 1-6B may be further configured as described herein. In addition, the system 100 may be configured to perform any other step(s) of any of the method embodiment(s) described herein. The following method embodiments relate to sorting animals from a heterogeneous grouping into two or more groupings, where each group of the two or more groupings includes individual animals that are similar to each other to within a predetermined threshold of similarity. For example, the predetermined threshold of similarity may include an indication that an animal in this group is one of less than two percent (2%) of animals of its breed that have a weight, at its height, of greater than 498.95 kg (1100 lbs). By way of another example, the predetermined threshold of similarity may include an indication that an animal in this group is one of less than ten percent (10%) of animals of its breed, at its height, that has a weight of greater than 476.27 kg (1050 lbs) and less than 498.95 kg (1100 lbs).

It is generally recognized that system 100 is suitable for implementing the sensor input and data processing level steps of the following embodiments. It is noted, however, the methods described below are not limited to the architecture of 100.

Figure 8:
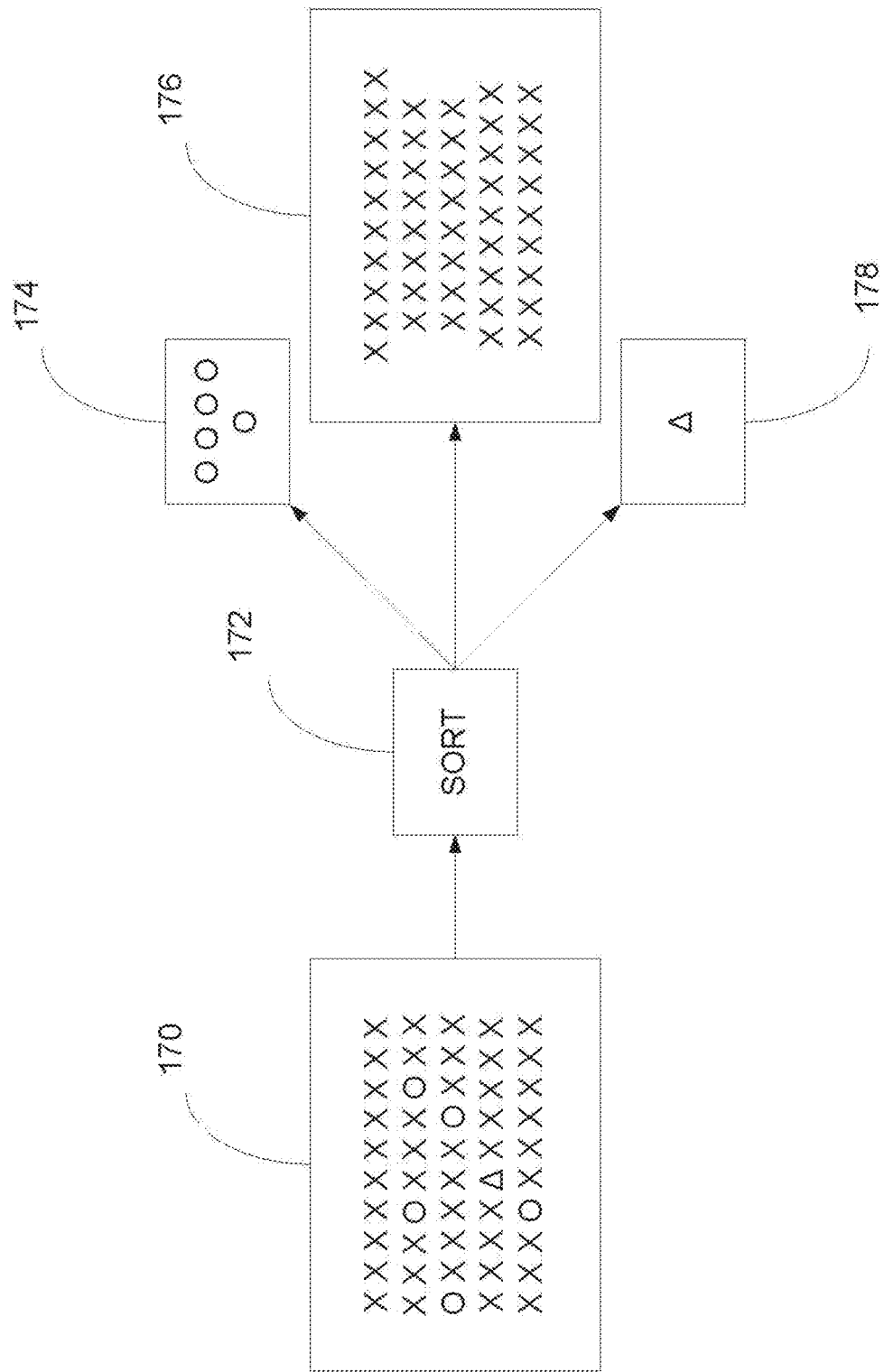
FIG. 8 is a block diagram depicting an overview of a sorting algorithm, in accordance with embodiments of the present disclosure.

Referring now to FIG. 8, in an exemplary embodiment of a sorting algorithm disclosed herein, the PLC 102 is configured to receive a heterogeneous group 170, perform a sorting algorithm 170, and obtain a two or more groups 174, 176, and 178. In an exemplary embodiment, each of the groups 174, 176, and 178 differ from another group by at least one variable, the at least one variable including at least one of a days on feed (DOF) variable and a care (e.g., medical) protocol variable. In other words, each of the groups 174, 176, and 178 include individual animals that are similar to each other to within a predetermined threshold of similarity, unless the group has only a single animal (e.g., group 178).

In an exemplary embodiment, inputs into the sorting algorithm 170 include an animal combinational characteristic and a time-dependent variable. In another exemplary embodiment, inputs into the sorting algorithm comprise two or more animal combinational characteristics and two or more time-dependent variables, where an animal combinational characteristic is a characteristic determined as a result of a combination of two or more animal characteristics (e.g., bone structure, height, weight, etc.). For example, the two or more animal combinational characteristics may include a body mass index (BMI) and an average daily gain (ADG), while the two or more time-dependent variables may include a time to market (TTM) variable and a days on feed (DOF) variable.

In an exemplary embodiment, the inputs into the sorting algorithm 170 are adjustable depending on a desired outcome. For example, a feedlot operator desiring to reduce yield grade standards 4 and 5 (e.g., YG 4&5), may wish to adjust a BMI/weight sorting intercept, reduce ADG estimates, and/or increase DOF. By way of another example, a feedlot operator wishing to capitalize on a shorter TTM variable, may increase a DOF variable.

In an exemplary embodiment, the outputs of the sorting algorithm 170 are also adjustable depending on the inputs entered into the system 100. For example, if BMI is input (either by computation or manual entry), then outputs may include DOF as well as a feed-pen determination that corresponds to the DOF. By way of another example, if weight is input, and the weight is significantly lower than a typical cow of the cow's breed, then a feed-pen determination and a medical/care protocol may be output, where the medical/care protocol ensures that the cow gets the necessary probiotics, antibiotics, and/or medical attention necessary and the feed-pen determination corresponds to a feed-pen located to ensure the cow gets what it needs.

In an exemplary embodiment, the sorting algorithm 170 includes a computation of a pre-determined optimal frame score for a specified period of time. In embodiments, the pre-determined optimal frame score is adjustable depending on the specified period of time (e.g., depending on TTM or DOF). For example, given the bone structure of an animal as measured by sensors 106 and the breed of the animal as determined by ID sensor 134 (or as selected by an operator from a drop-down menu), the animal may be able to obtain a market-based optimal frame score according to statistical population data stored in database 112 for a typical animal of the breed. In embodiments, the market-based optimal frame score may be based on an optimum muscle to fat ratio, where too much fat on an animal may result poor finishing (e.g., packaging) quality, while too little fat and/or muscle may result a poor economic return on the animal. In another embodiment, the market-based optimal frame score may be based on the BMI and the ADG. It is noted that while weight gain beyond a desired weight indicated by the market-based optimal frame score can occur, such weight gain is either minimal, or results in a muscle to fat ratio that is below an optimum level.

In an exemplary embodiment, the pre-determined optimal frame score is based on age, weight, and hip height and a statistically-based optimal frame score as measured when an average animal of a specific breed is sold to the market. For example, a Black Angus cow having a hip height Y, may have an average market-based optimal frame score determined as a weight W based on a height, where variables Y and W are related according to the following:

$$W=(Y-K_1)/K_2$$

where $K_1$ and $K_2$ are constants determined based on a linear regression fit determined according to population statistics. For example, K1 may be from 32 to 45, while K2 may be from 0.0068 to 0.0145. Therefore, in some embodiments, the pre-determined optimal frame score of an animal may be determined by factoring age, weight, and hip height of an animal at a first point in time (e.g., prior to being sold to market), then extrapolating to a second point in time (e.g., based on TTM) based on the average market-based optimal frame scores of animals of the same breed.

It is noted that a number of variables may affect the pre-determined optimal frame score. For example, a season in which the ADG is being measured may affect the pre-determined optimal frame score. For instance, the ADG may be known to decrease during winter months, which would result an inaccurate pre-determined optimal frame score if the season is unaccounted for. In this regard, by entering the season, or otherwise factoring it into the sorting algorithm 170, ADG may be accounted for by increasing the DOF variable accordingly.

It is noted that some inputs for the sorting algorithm 170 may be computed based on measurements obtained in the processing station 138, while others may be input and/or adjusted by an operator. For example, the BMI and/or ADG animal combinational characteristics may be computed by a sorting application (below) upon receipt of bone structure measurements by PLC 102. The BMI may be computed using age (e.g., first point in time), weight, and/or hip height. For example, in some embodiments, the BMI is computed as follows:

$$BMI = \left(\frac{W}{Y^{1.6}}\right)$$

where W is weight, and Y is hip height.

The ADG may be computed using days in a season, weight, and height according to the following:

$$ADG = \left(\frac{Wt.}{Ht.}\right) \Big/ D$$

where D is a number of days in a feeding season or a number of days in a feed stage. It is noted that ADG may also take into account a season of the year and/or rain fall conditions. In some embodiments, there are five feed stages (e.g., S0, S1, S2, S3, and S4), including from 20 to 80 days per feed stage, with the number of days per feeding season being adjustable according to a desired outcome.

Referring now to FIGS. 9-16, the sorting algorithm 170 generally includes at least four steps, capture, collection, verification, and sorting application functions, which may be performed individually or collectively by a module 172 of the PLC 102, or a sub-module 172 of the PLC 102. For example, a sort module 172 (FIG. 1) of PLC 102 may include one or more sub-modules 172, each sub-module 172 configured for performing a step of the sorting algorithm 170. In other embodiments, a sub-module 172 may perform two or more steps of the sorting algorithm 170. In other embodiments, the PLC 102 may include a single sort module 172 for performing the sorting algorithm 170.

Figure 9:
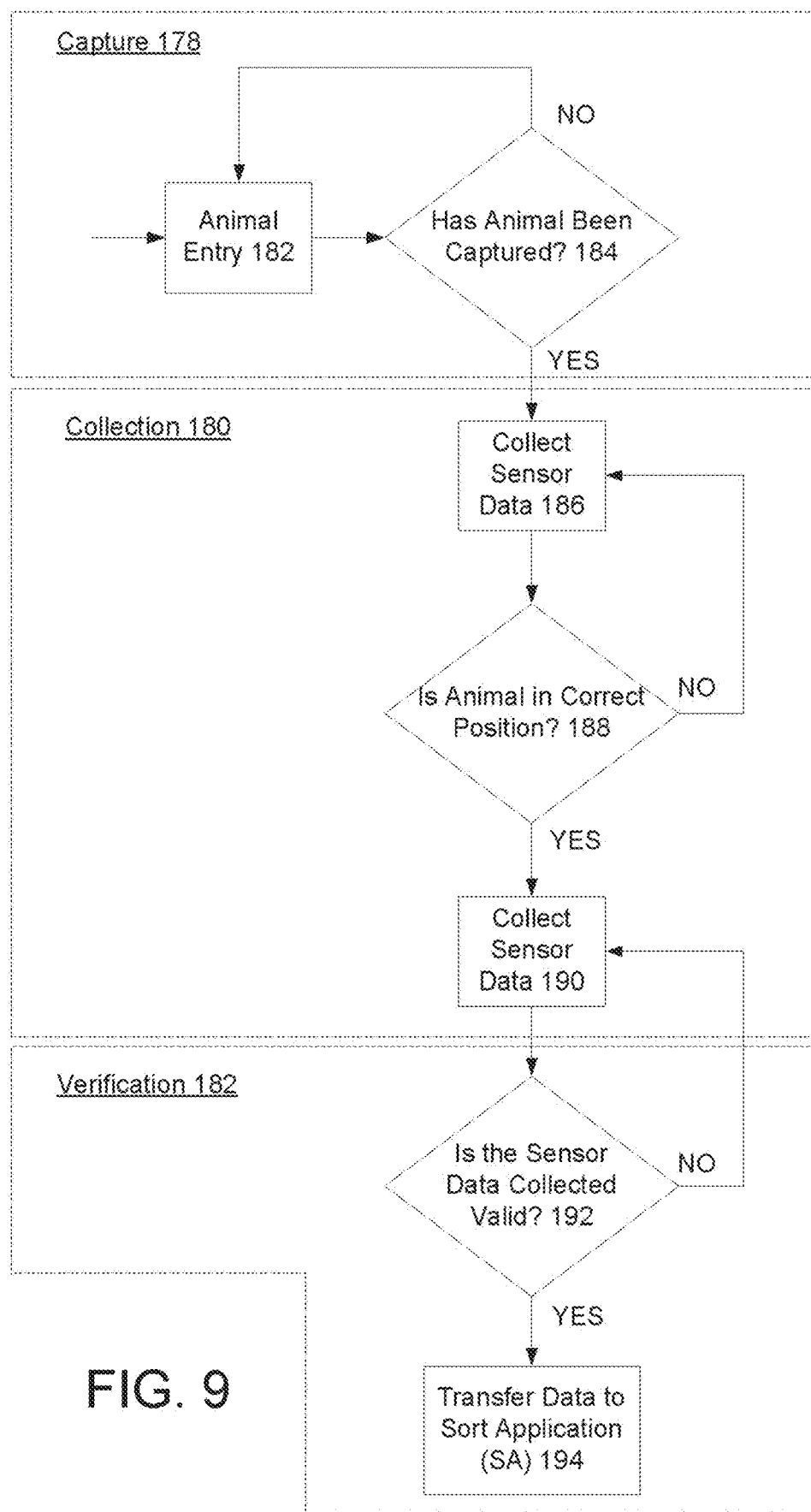
FIG. 9 is a flow diagram depicting steps of a sorting algorithm, in accordance with an embodiment of the present invention.
Figure 10:
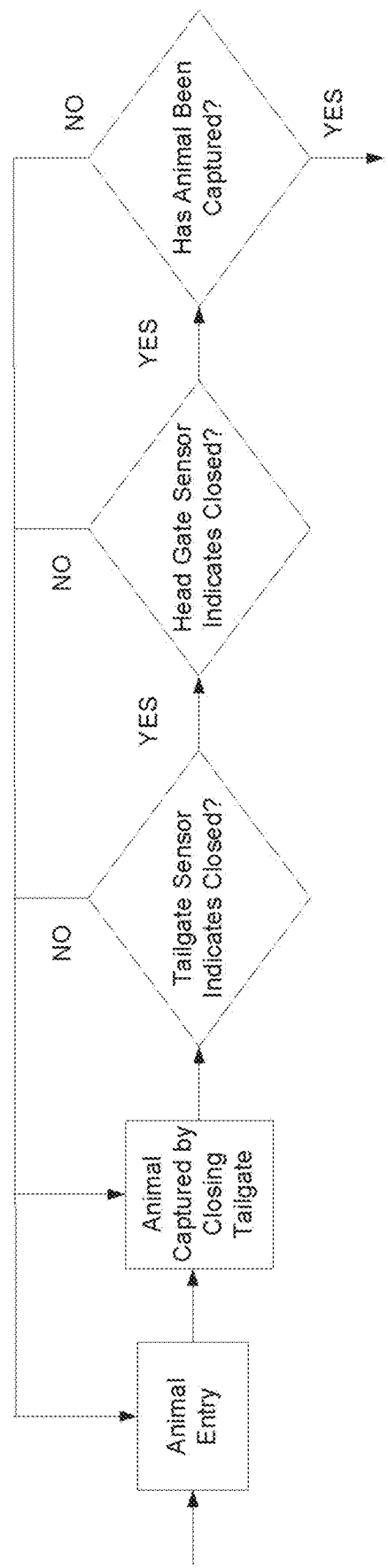
FIG. 10 is a flow diagram depicting a portion and sub-steps of the sorting algorithm of FIG. 9, in accordance with embodiments of the present disclosure.
Figure 11:
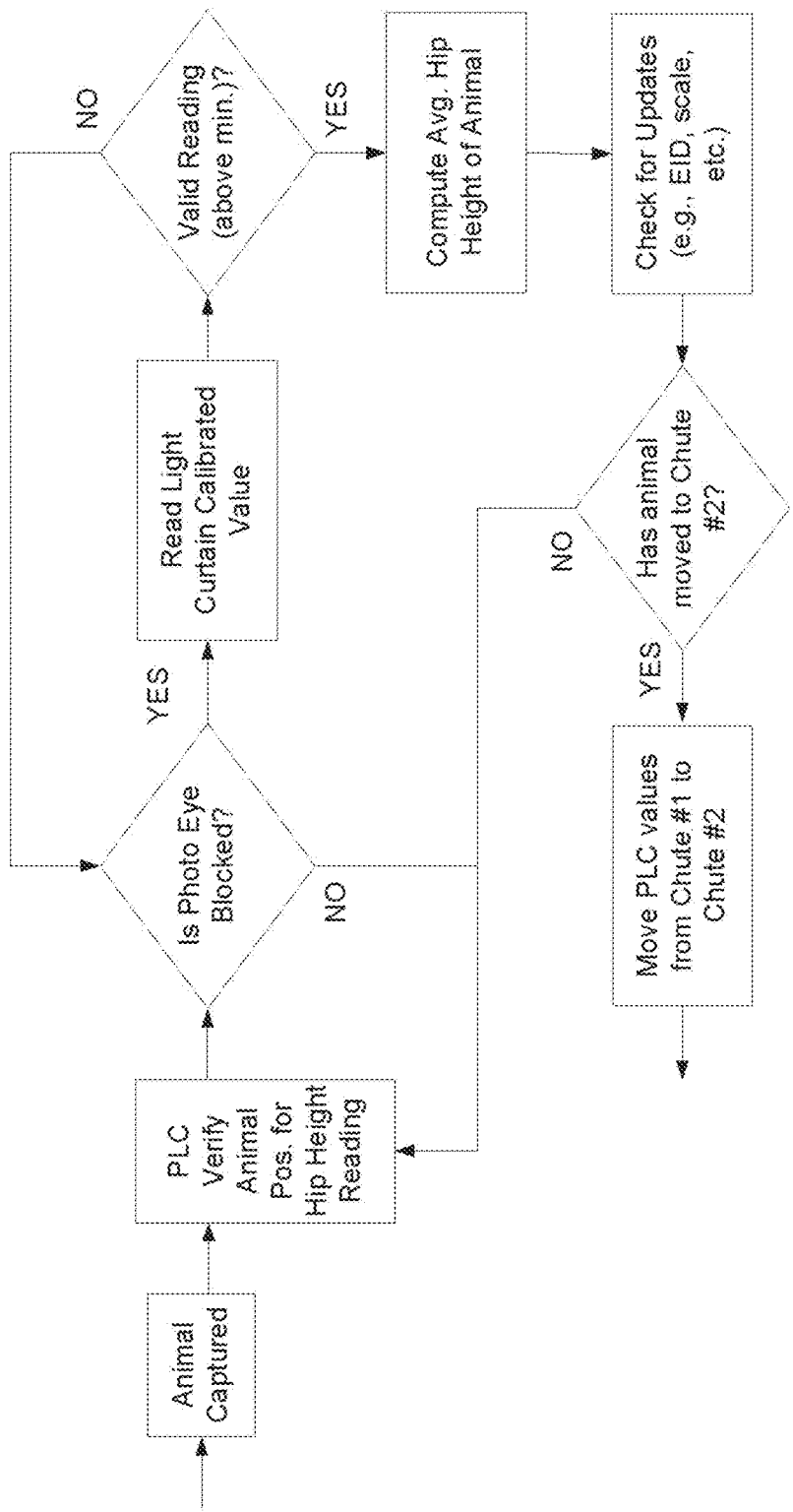
FIG. 11 is a flow diagram depicting a portion and sub-steps of the sorting algorithm of FIG. 9, in accordance with embodiments of the present disclosure.

FIG. 9 illustrates a flow diagram depicting an overview of the capture, collection, and verification steps of sorting algorithm 170, in accordance with one or more embodiments of the present disclosure.

In step 178, an animal is captured for sorting. For example, an animal may enter a gate of a processing station 138, and PLC 102 determines that the animal has been captured 184 when gate sensor(s) 132 indicate that a door of the gate has moved from an open position to a closed position.

In step 180, data from sensors 106 may be collected. For example, the data collected may comprise a two or more animal characteristics, as measured by sensors 106. In an exemplary embodiment, the two or more animal characteristics are used to compute combinational characteristics (e.g., BMI and/or an ADG) of an animal. In an exemplary embodiment, the animal characteristics collected by sensors 106 include, but are not limited to, ID information (e.g., number, age, feed stage, etc., as associated with the animal), weight, height, BCS, and combinations thereof. For instance, upon entry into the processing station 138, an RFID tag 168 may be read by an RFID receiver 134.

Step 180, may further include collecting data from sensors 106 to determine if the animal is in the correct position 188. For example, the photo eye 162 may indicate that the chest portion 164 of the animal is in an optimal position 188, based on average size of cattle, in order to take size measurements. If the photo eye indicates the optimal position, then the size measurements are obtained 190.

In an exemplary embodiment, an accuracy of the weight sensor 124 or the height sensor 126 may be positionally dependent. For example, if the chest portion 164 of the animal is in proper position, then the weight of the animal may be evenly distributed across the weight sensor 124, enabling the weight sensor 124 to obtain maximum accuracy.

Figure 12:
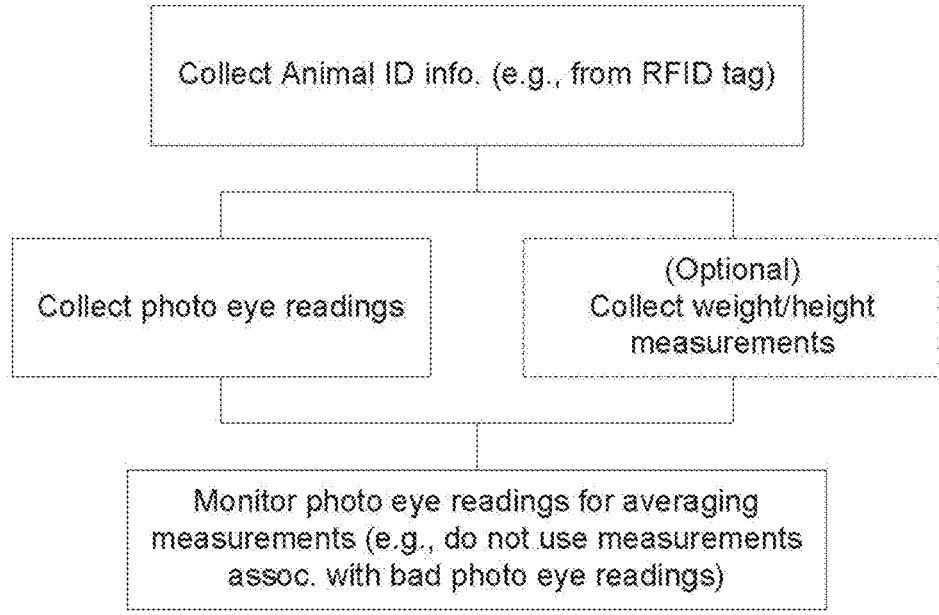
FIG. 12 is a flow diagram depicting variations of the portion or sub-steps of the sorting algorithm of FIG. 11, in accordance with embodiments of the present disclosure.
Figure 12:
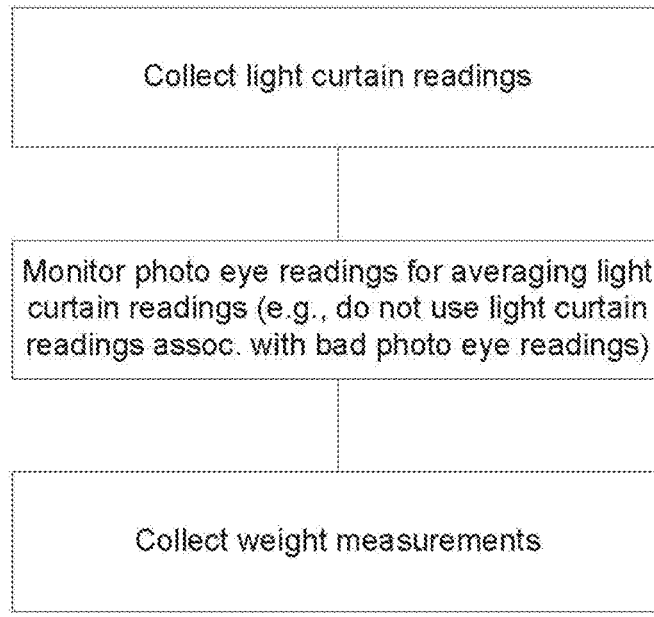
Figure 13:
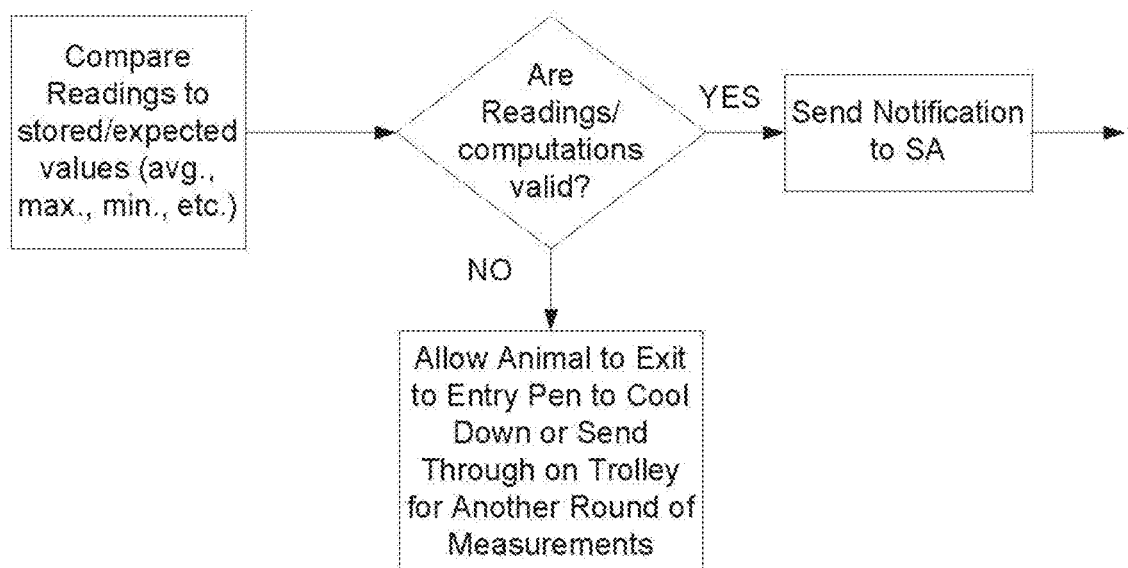
FIG. 13 is a flow diagram depicting a portion or sub-steps of the sorting algorithm in FIG. 9, in accordance with embodiments of the present disclosure.

Referring now to FIG. 12, the collection step 180A may include optionally collecting weight measurements and/or height measurements automatically and simultaneously with collecting readings from photo eye 162. Thus, upon capture 184 (or soon thereafter (e.g., 5-10 seconds after), the weight measurements and photo eye readings occur automatically. A certain number of readings are taken (e.g., 100), while monitoring and/or storing the indications given by indicator 166. After the certain number of readings are taken, the PLC 102 discards any weight measurements that were not recorded simultaneous with a green light from the indicator 166, where the green light indicates the animal is in the proper position.

In another embodiment, the collection step 180B may be sequential. For example, the light curtain 150 may be configured to obtain measurements/readings as soon as the photo eye 162 gives a green light indication, and the weight sensor 124 collects weight measurements after, or during, the measurements/readings made by the light curtain 150. In other embodiments, the weight sensor 124 is not positionally dependent, and may obtain weight measurements at any point that the animal is in the processing station 138.

In step 182, a verification step is performed. For example, the sensors 106 may have collected a group of measurements associated with a specific animal. The group of measurements, or each measurement individually, may be compared to groups of statistical data or individual statistical data that has been computed based on one or more typical (e.g., average) animals of the same breed to determine validity 192. If the data collected in step 180 is within a predetermined threshold, then the data is transferred to a sorting application 194. In some embodiments, a notification is sent to the sorting application 194 that data is ready to be input, and the sorting application 194 queries the PLC 102 for the data upon receipt of the notification. If the data collected in step 180 is not within the predetermined threshold, then the PLC 102 may initiate another cycle of data collection from sensors 106.

In some embodiments, step 182 may include discarding outliers. For example, if one or more measurements are outside the predetermined threshold, they may be discarded as outliers.

Figure 14:
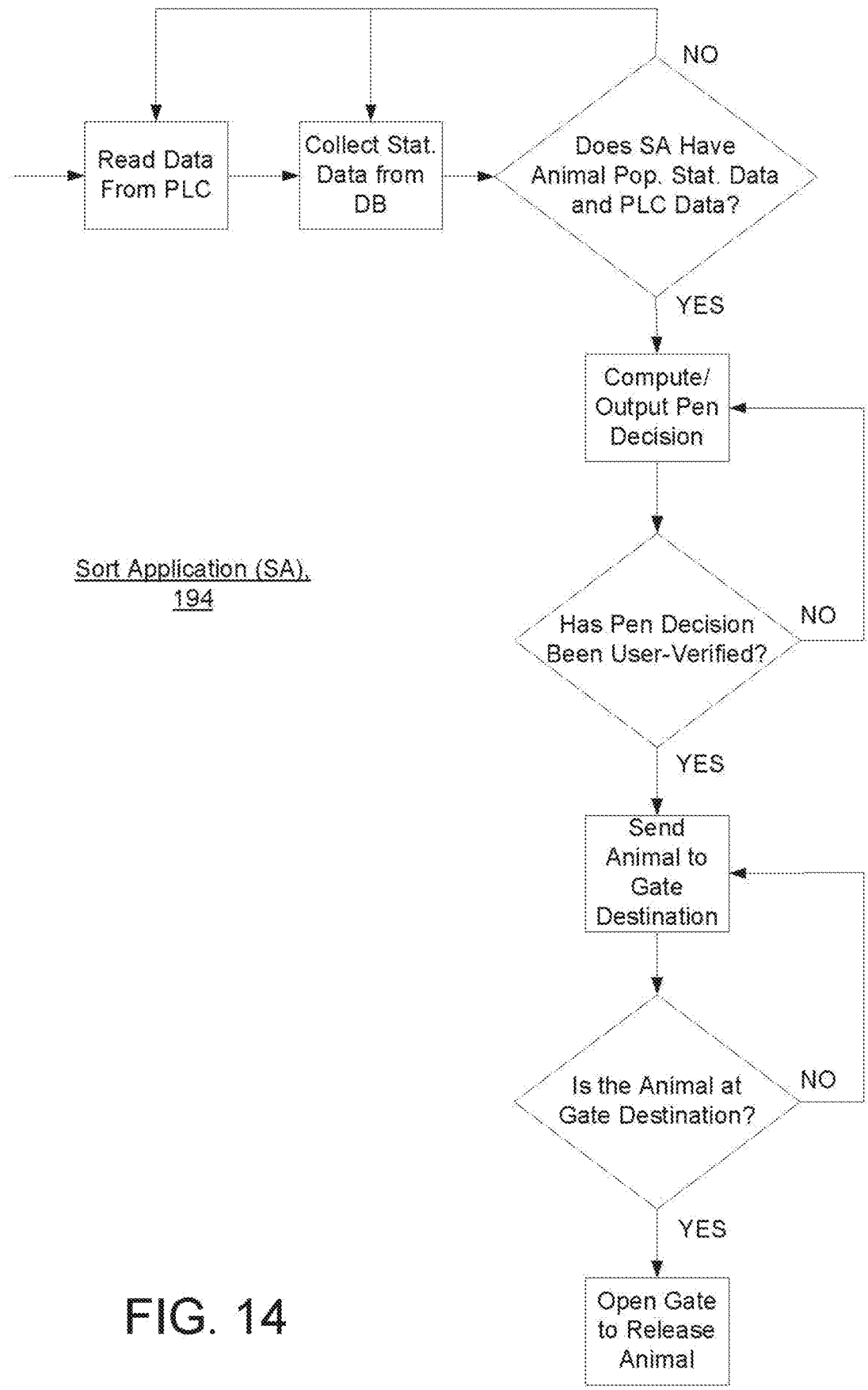
FIG. 14 is a flow diagram depicting steps of a sort application of a sorting algorithm, in accordance with embodiments of the present disclosure.

Referring now to FIG. 14, in an exemplary embodiment, the sorting application 194 may be included in the same housing as the PLC 102, or may be a separate software application loadable onto mobile device 122. The sorting application 194 may include programmable logic that may access memory 104, including database(s) 112, to perform sort algorithm 170, or a portion of sort algorithm 170. For example, one or more steps of the sort algorithm 170 may be performed by the sorting application 194, including but not limited to: reading data from the PLC 102; collecting statistical data from database(s) 112; determining if both animal population statistical data from database 112 and data from PLC 102 are available for input into the sorting application 194; computing a feed-pen decision (e.g., performing the actual calculations associated with the sort algorithm 170 from measurements obtained by PLC 102), which is output to an operator in some embodiments; providing control signals indicative of the feed-pen decision to the livestock routing mechanism 110 that has programmable memory to direct the animal to its pen destination; determining whether or not the animal has arrived at the pen destination; and actuating the livestock routing mechanism 110 to release the animal. It is noted that in some embodiments, the step of opening the gate of the feed-pen destination is performed automatically (e.g., sorting application 194 may not be involved in opening) animal is in the proper position (e.g., aligned) with respect to a gate corresponding to the pen decision.

Figure 15:
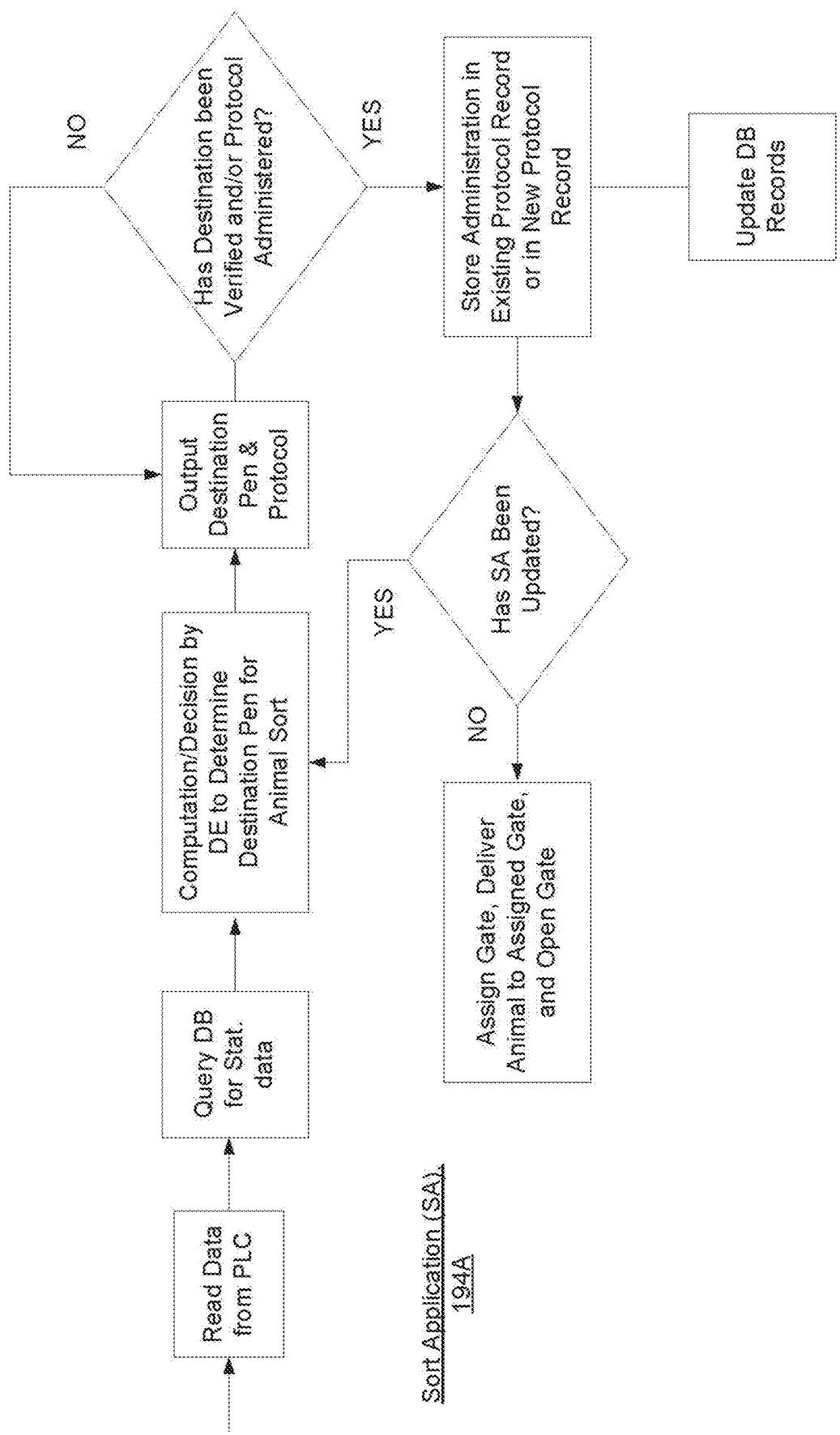
FIG. 15 is a flow diagram depicting steps of a sort application of a sorting algorithm, in accordance with embodiments of the present disclosure.

Referring now to FIG. 15, in an exemplary embodiment, the sorting application 194A may function similarly to sorting application 194, except that an operator may not need to verify the feed-pen decision. In another embodiment of sorting application 194A, the operator may need to verify the feed-feed-pen decision and a determined protocol. For example, based on the determinations made by the PLC 102, a care or medical protocol may be determined by PLC 102. The sorting application 194A may include a determination as to whether or not the care or medical protocol has been administered; storing of administration records in an existing protocol record or in a new protocol record; updating the database(s) 112 by storing any delta information occurring in the protocol records; determining whether the sorting application 194A has been updated or needs to be updated with any manufacturer or factory updates; and assigning a gate number associated with a feed-pen determination for animal delivery.

In an exemplary embodiment, the gate number is assigned to the animal by storing the assigned gate number in the RFID tag 168 of the animal. Thus, upon arrival at the gate of the determined pen, an RFID receiver (not shown) of the determined pen reads the gate determination information from the RFID tag 168 and accordingly opens the gate of the determined pen.

Figure 16:
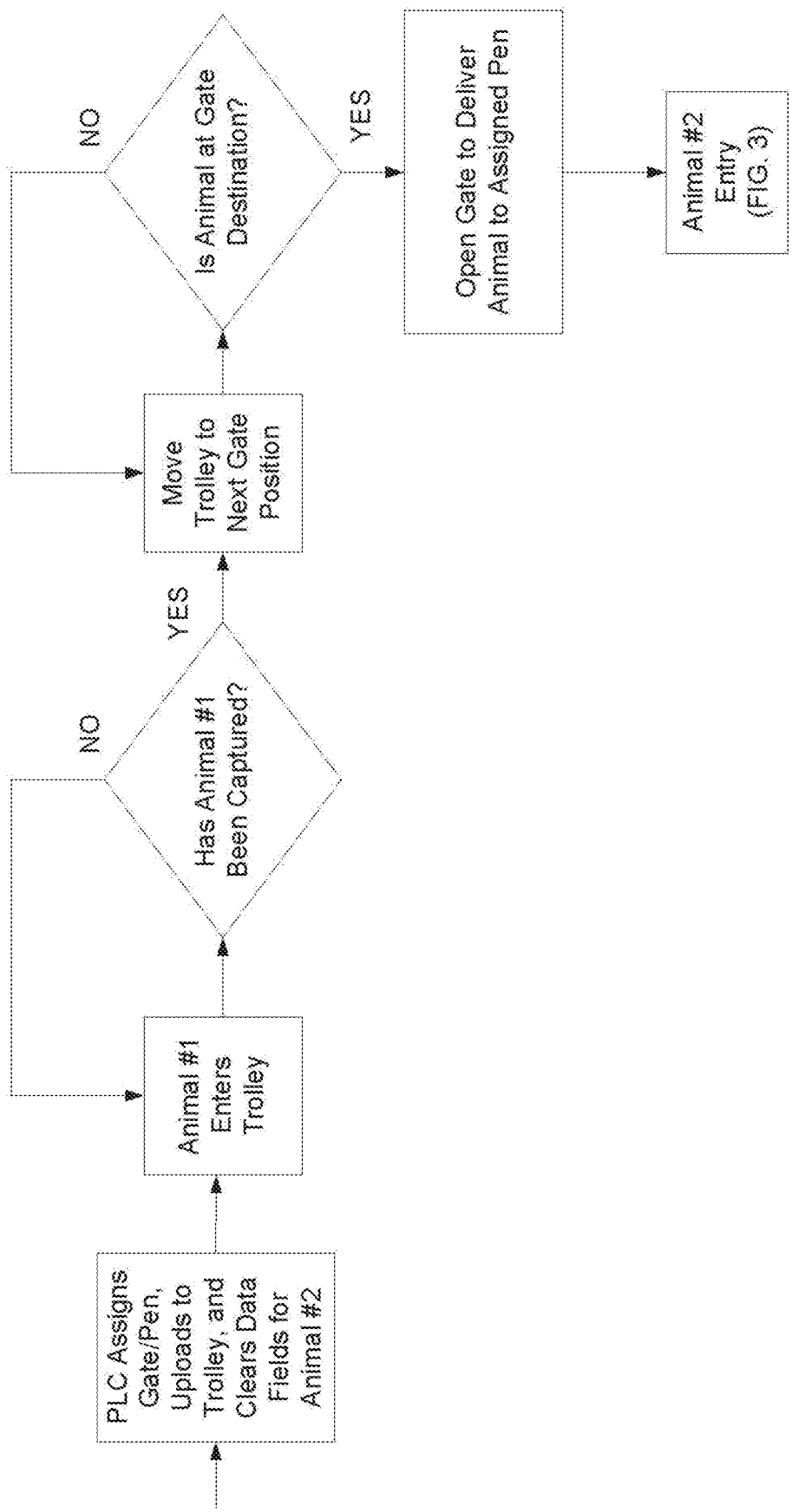
FIG. 16 is a flow diagram depicting steps of a sorting algorithm, in accordance with embodiments of the present disclosure.

Referring now to FIG. 16, in an exemplary embodiment the PLC 102 is configured for continuously processing animals. For example, the PLC 102 may be configured to monitor the exit of a first animal from the processing station 138 via the livestock routing mechanism 110. Once the first animal has exited via the livestock routing mechanism 110 (e.g., meaning sorting application 194 has finished performing its portion of sort algorithm 170), the PLC 102 authorizes movement of the livestock routing mechanism 110 to direct the livestock to a next gate position. The PLC 102 is further configured to monitor whether or not the first animal is at its gate destination, and the opening of the gate to deliver the first animal. The PLC 102 may be further configured to open, or authorize opening (e.g., manually) of, a gate of the processing station 138 or the livestock routing mechanism 110 to admit entry of a second animal.

In an exemplary embodiment, the PLC 102 is configured to collect measurements for the sorting algorithm 170 simultaneously while minimizing error. For example, the PLC 102 may discard outlier readings, may record and/or store error associated with each sensor of sensors 106, and may determine one or more optimal frame score adjustments due to the overall associated error. For instance, algorithm 170 may be programmed into the PLC 102 for determining the optimal frame score of an animal based on multiple characteristics of the animal, each of the characteristics being assigned an associated weight in the overall optimal frame score determination. An error associated with a sensor responsible for obtaining a characteristic may also be weighted, the weight being comparable to the weight assigned to the characteristic weight in the optimal frame score algorithm. In an exemplary embodiment, the PLC 102 may adjust an optimal frame score determined by the optimal frame score algorithm according to an overall combined, weighted error.

In an exemplary embodiment, a highest reading, an average reading, a median reading, a lowest reading, a highest light path of the light paths broken, or combinations thereof, may be recorded as the height of the animal. It is noted that the choice of whether the system is programmed to determine height based on highest, lowest, or median readings, etc., may be an adjustable design choice, determined based on feed and growth goals and/or feed and growth costs. For example, an operator may choose as a design choice that the system 100 bases its determination of animal height on maximum/highest readings as opposed to median readings because this may sometimes result height readings that are greater than the actual height of the animal, and the operator would rather err on the side of caution and provide more feed to animals than would actually be required (e.g., if results were determined with measurements having 100% accuracy) to meet their optimal frame score. By way of another example, perhaps feed is scarce or feed prices are high, thus, the operator may choose as a design choice that system 100 uses median readings (e.g., after outliers are discarded) as the height of the animal because this may sometimes result in determinations of animal height that are smaller than the animal's actual height, ultimately resulting less feed provided to the animal. It is further noted that these design considerations, as well as others, and their attendant advantages and disadvantages will be recognizable by those skilled in the art and are adjustable according to inventive concepts disclosed herein.

It is believed that the present disclosure and many of its attendant advantages will be understood by the foregoing description, and it will be apparent that various changes may be made without departing from the scope and spirit of the invention or without sacrificing all of its material advantages. The form herein before described being merely an explanatory embodiment thereof, it is the intention of the following claims to encompass and include such changes.

Further, it is understood that the specific order or hierarchy of steps in the methods disclosed are examples of exemplary approaches. Based upon design preferences, it is understood that the specific order or hierarchy of steps in the method can be rearranged while remaining within the scope of the present disclosure. The accompanying method claims present elements of the various steps in a sample order, and are not meant to be limited to the specific order or hierarchy presented.

What is claimed:

1. A system for sorting livestock, comprising:
   a weigh box having holding bars for holding livestock in a processing station;
   at least one light curtain;
   a programmable logic controller (PLC) with access to memory having computer executable program code encoded therein, the PLC configured for:
   receiving measurements collected by the at least one light curtain;
   determining one or more livestock size parameters for the at least one animal from the measurements;
   computing a frame score from the one or more livestock size parameters;

comparing the frame score to an optimal frame score;
generating a feed-pen destination according to the comparison of the frame score to an optimal frame score;
providing activation signals to one or more livestock routing mechanisms based on the feed-pen destination.

2. The system of claim 1, wherein the PLC is further configured for:
computing the optimal frame score.

3. The system of claim 2, wherein the computing the optimal frame score includes:
computing a market-based optimal frame score from average market population livestock size parameters;
extrapolating the optimal frame score from the market-based optimal frame score according to a remaining time to market.

4. The system of claim 3,
wherein the market-based optimal frame score is an optimal weight (W) computed from a hip height (Y) and constants $K_1$ and $K_2$ as:

$$W = (Y - K_1)/K_2$$

where $K_1$ and $K_2$ are determined based on a linear regression fit from the average market population livestock size parameters.

* * * * *